United States Patent [19]

Peltier, Jr. et al.

[11] Patent Number: 5,599,461
[45] Date of Patent: *Feb. 4, 1997

[54] PROCESS AND PRODUCT PRODUCED THEREBY FOR DISINFECTION AND AGRICULTURAL REUSE OF ORGANIC SLUDGES

[76] Inventors: Morris Peltier, Jr., 1140 Honeycomb Dr., Cade, La. 70519; Eddie P. Mayeux, Jr., 125 Walker Gravel Pit Rd., Dry Prong, La. 71423

[ * ] Notice: The term of this patent shall not extend beyond the expiration date of Pat. No. 5,575,928.

[21] Appl. No.: 444,144

[22] Filed: May 18, 1995

Related U.S. Application Data

[63] Continuation-in-part of Ser. No. 341,801, Nov. 18, 1994, Pat. No. 5,575,928.

[51] Int. Cl.$^6$ .............................. C02F 1/50; C02F 11/00
[52] U.S. Cl. ............................... 210/764; 422/28; 422/32
[58] Field of Search ............................ 210/764; 422/28, 422/32; 71/11, 12, 13, 14, 23, 24, 25

[56] References Cited

U.S. PATENT DOCUMENTS

| | | | |
|---|---|---|---|
| 3,942,970 | 3/1976 | O'Donnell | 71/12 |
| 4,067,896 | 1/1978 | Pierce | 424/302 |
| 4,729,831 | 3/1988 | Fujino | 210/631 |
| 4,732,684 | 3/1988 | Fujino | 210/631 |
| 4,935,447 | 6/1990 | Philips et al. | 514/640 |
| 5,077,314 | 12/1991 | Philips et al. | 514/640 |

*Primary Examiner*—Neil McCarthy
*Attorney, Agent, or Firm*—Onebane, Bernard, Torian, Diaz, McNamara & Abell Law Firm

[57] ABSTRACT

There is disclosed a process and product made by said process, for conversion of organic waste sludges bearing potentially pathogenic bacteria, helminth ova and enteric virus into a non-odoriferous, non-pathogenic agricultural medium which is highly nutritious to plant life; which process includes: disinfecting the sludge by thoroughly mixing the organic sludge with an effective amount of at least one of a class of chemical compounds which form methyl-isothiocyanate ("MITC"), such as sodium N-methyldithiocarbamate in aqueous solution and increasing the pH of the sludge to substantially 12 or more for an effective length of time; and, conditioning the disinfected sludge with electrolytic soil additive, hydrophilic polymer, organic bulking agents and/or inorganic conditioning materials. The product of said process constitutes a composition highly beneficial as a plant growing medium, soil enriching additive and the like.

42 Claims, 3 Drawing Sheets

| | TEST 1 | | | | TEST 2 | | | | | TEST 3 | TEST 4 |
|---|---|---|---|---|---|---|---|---|---|---|---|
| Strength | 2,500 ppm | 1,250 ppm | 625 ppm | 312.5 ppm | 156.3 ppm | 2,500 ppm | 1,250 ppm | 625 ppm | 312.5 ppm | 156.3 ppm | 2,500 ppm | 2,500 ppm |
| 2 days | 96,4,0,0 | 100,0,0,0 | 87,13,0,0 | 63,37,0,0 | 0,52,48,0 | 100,0,0,0 | 100,0,0,0 | 100,0,0,0 | 100,0,0,0 | 100,0,0,0 | 100,0,0,0 | 100,0,0,0 |
| 4 days | 96,4,0,0 | 80,14,0,6 | 60,20,11,9 | 32,18,0,50 | 0,28,27,45 | 100,0,0,0 | 100,0,0,0 | 100,0,0,0 | 100,0,0,0 | 100,0,0,0 | 100,0,0,0 | 100,0,0,0 |
| 6 days | 96,4,0,0 | 56,26,9,9 | 37,28,18,17 | 3,2,0,95 | 0,0,4,96 | 100,0,0,0 | 100,0,0,0 | 100,0,0,0 | 100,0,0,0 | 100,0,0,0 | 100,0,0,0 | 100,0,0,0 |
| 8 days | 90,10,0,0 | 32,15,5,48 | 35,19,8,38 | 0,0,0,100 | 0,0,0,100 | 100,0,0,0 | 100,0,0,0 | 100,0,0,0 | 100,0,0,0 | 100,0,0,0 | 100,0,0,0 | 100,0,0,0 |
| 10 days | 85,10,3,2 | 21,18,6,55 | 28,14,6,52 | 0,0,0,100 | 0,0,0,100 | 100,0,0,0 | 100,0,0,0 | 100,0,0,0 | 100,0,0,0 | 100,0,0,0 | 100,0,0,0 | 100,0,0,0 |
| 12 days | 80,10,3,7 | 17,16,4,63 | 20,15,5,60 | 0,0,0,100 | 0,0,0,100 | 100,0,0,0 | 100,0,0,0 | 100,0,0,0 | 100,0,0,0 | 100,0,0,0 | 100,0,0,0 | 100,0,0,0 |
| 14 days | 75,12,5,8 | 14,14,4,68 | 12,15,5,68 | 0,0,0,100 | 0,0,0,100 | 100,0,0,0 | 100,0,0,0 | 100,0,0,0 | 100,0,0,0 | 100,0,0,0 | 100,0,0,0 | 100,0,0,0 |
| 16 days | 73,18,0,9 | 19,18,5,58 | 14,8,5,73 | 0,0,0,100 | 0,0,0,100 | 100,0,0,0 | 100,0,0,0 | 100,0,0,0 | 100,0,0,0 | 100,0,0,0 | 100,0,0,0 | 100,0,0,0 |
| 18 days | 72,18,3,7 | 27,17,5,51 | 16,12,3,69 | 0,0,0,100 | 0,0,0,100 | 100,0,0,0 | 100,0,0,0 | 100,0,0,0 | 100,0,0,0 | 100,0,0,0 | 100,0,0,0 | 100,0,0,0 |
| 20 days | 70,17,5,8 | 33,15,4,48 | 20,15,1,64 | 0,0,0,100 | 0,0,0,100 | 100,0,0,0 | 100,0,0,0 | 100,0,0,0 | 100,0,0,0 | 100,0,0,0 | 100,0,0,0 | 100,0,0,0 |

Format of numerical readings = % no division; % 1 division; % 2 divisions; % more than 2 divisions

FIG. 2

| DILUTION | INPUT CONTROL (Untreated test media and polio virus) | VIRUS CONTROL (Untreated test media, sludge and polio virus) | CYTOTOXICITY CONTROL (Treated media and polio virus) | TEST (Treated sludge and polio virus) |
|---|---|---|---|---|
| Cell Ctrl | 0000 | 0000 | 0000 | 0000 |
| $10^{-1}$ | ++++ | ++++ | TTTT | TTTT |
| $10^{-2}$ | ++++ | ++++ | 0000 | 0000 |
| $10^{-3}$ | ++++ | ++++ | 0000 | 0000 |
| $10^{-4}$ | ++++ | ++++ | 0000 | 0000 |
| $10^{-5}$ | ++++ | ++++ | 0000 | 0000 |
| $10^{-6}$ | ++++ | ++00 | 0000 | 0000 |
| $10^{-7}$ | 0++0 | 0000 | 0000 | 0000 |
| $10^{-8}$ | | | | |
| $TCID_{50}/ml$ | $10^{9.0}$ | $10^{7.0}$ | $10^{1.5}$ | $10^{1.5}$ |

(+) = positive for the presence of test virus
(0) = no test virus recovered and/or no cytotoxicity present
(T) = Cytotoxicity present

FIG. 3

PROCESS AND PRODUCT PRODUCED THEREBY FOR DISINFECTION AND AGRICULTURAL REUSE OF ORGANIC SLUDGES

This application is a continuing-in-part ("C-I-P") of application Ser. No. 08/341,801 filed Nov. 18, 1994, entitled "Process and Product Produced Thereby for Disinfection and Agricultural Reuse of Organic Sludges", now U.S. Pat. No. 5,575,928.

BACKGROUND OF THE INVENTION

1. Field of the Invention

The invention disclosed herein relates generally to the field of treating organic waste sludges to reduce and/or remove viable organisms and/or vector attraction, so that such sludges may be beneficially reused with safety. More particularly the invention disclosed herein relates processes for conversion of said sludges, which are inherently highly nutritious to plants, into a safe, enriched agricultural medium. With more particularity the invention relates to conversion of organic sludges into a form that may be easily handled, and have characteristics enhancing the ability of plants to extract nutrients from the rich organic materials included therein.

2. Description of Related Art

Organic waste sludges presently constitute a substantial problem in many areas of the world. Such wastes are by-products of municipal and private waste treatment plants, feed lot operations, sawmills, paper mills and other industrial operations wherein wastes of biological origin are intentionally collected for the purpose of treatment and/or secondarily aggregate as a consequence of a principal operation being conducted.

A problem with such organic sludges is that they provide an excellent growth medium for many types of potentially pathogenic bacteria, helminth ova and/or enteric viruses, which are almost inevitably introduced into said sludges by the influent waste stream. Because raw organic sludges frequently contain such potentially pathologic organisms they can be dangerous to human, animal and plant life, and proper disposal or reuse of said sludges presents a substantial problem.

Said sludges are also typically odoriferous, have substantial vector (pests, such as rats, mice, roaches and some birds) attraction, and exist in the form of a sticky, wet, cohesive mass. These characteristics substantially limit where untreated sludges may be acceptably disposed, entail the risk of vectors widely dispersing pathogens in the sludge, and make transportation and handling of the sludge difficult.

However, the very nutritious properties of organic sludge which cause potentially pathogenic organisms to flourish, also provide a potentially highly beneficial reuse for said sludge, as an agricultural enriching medium, provided that the potentially pathogenic organisms, vector attraction and difficult handling characteristics can be significantly improved.

A number of methods, described in 40 CFR Part 257, are known to reduce pathogens. These include aerobic digestion, anaerobic digestion, lime stabilization, air drying, composting, heat drying, heat treatment, gamma irradiation, electron irradiation and the methods shown on Table 6-1 of said regulation. In addition thereto U.S. Pat. Nos. 5,281,341 and 4,793,927 to Reimer's disclose methods for treating waste sludge with nitrous acid or ammonia.

All of the previously known methods involve one or more of the following disadvantages:
  a) substantial time of treatment,
  b) high energy usage,
  c) use of complex, expensive, permanently located equipment, and/or,
  d) transport of pathogen bearing sludges to a permanently located treating facility.

The invention disclosed herein substantially reduces these disadvantages by providing a fast, simple, inexpensive method of disinfecting organic wastes, on site, with inexpensive chemicals and inexpensive, transportable, mechanical equipment. The invention further provides a process, and a composition produced thereby, for enhancing the nutritional value and physical characteristics of said composition as a plant medium/soil enriching agent.

SUMMARY OF THE INVENTION

It is the principal object of the invention disclosed herein to provide an improved process for removal or substantial reduction of possible pathogenic organisms, such as pathogenic bacteria and enteric viruses and helminth ova, which avoids the disadvantages of the processes disclosed in 40 CFR Part 257. More particularly an important object of the invention disclosed herein is to provide a process by which organic waste sludges can be quickly and cheaply treated, to remove or substantially reduce potentially pathogenic organisms which can be found in said sludges, so that said organic sludges may be safely disposed or beneficially reused. Another object of the invention is to substantially reduce or eliminate vector attraction to said sludges. Yet another object of the invention is to provide a method which eliminates or substantially reduces offensively odoriferous characteristics of organic waste sludges. A further object of the invention is to provide a process whereby organic waste sludges, possibly harboring pathogenic bacteria, enteric virus and/or helminth ova, can be treated at the point of origin of said sludges rather than having to transport untreated sludges to distant, permanent facilities. Further objects of the invention are to provide a process for effective removal or reduction of pathogenic organisms, vector attraction and odoriferous characteristics which are energy efficient, inexpensive and do not themselves generate substantial amounts of wastes requiring controlled disposal. Yet a further object of the invention is to provide a composition and a process for making said composition which entails the safe re-cycling of organic sludges as a highly enriching plant medium and/or soil conditioning agent.

The invention disclosed herein may be utilized to accomplish each of the above objects set forth above. Pathogenic organisms, such as pathogenic bacteria and enteric viruses and/or helminth ova are removed and/or substantially reduced by the steps which include mixing the sludge with an effective amount of gaseous methyl-isothiocyanate, a liquid containing one or more dissolved chemical salts which liberate methyl-isothiocyanate when mixed with sludge, or by a combination of said gas and said liquid, and, if necessary, mixing the sludge with an alkali to increase the pH of sludge to substantially 12 or more. After disinfection the sludge may be treated with acid to deactivate further liberation of methyl-isothiocyanate and lower the pH of the treated sludge to a desired level, safely disposed, and/or, treated with soil additives, polymers, bulking materials, and/or organic/non-organic conditioning materials to form a non-odoriferous, non-cohesive, highly nutritious plant medium/soil enriching composition.

BRIEF DESCRIPTION OF THE DRAWINGS

FIG. 2 is a table depicting the results of helminth ova testing with various levels of sodium N-methyldithiocarbamate, potassium N-methyldithiocarbamate or sodium N-methyldithiocarbamate and ethanol.

FIG. 3 is a table depicting the results of virology testing with sodium N-methyldithiocarbamate and potassium hydroxide.

DESCRIPTION OF THE PREFERRED EMBODIMENT

Figure 1:
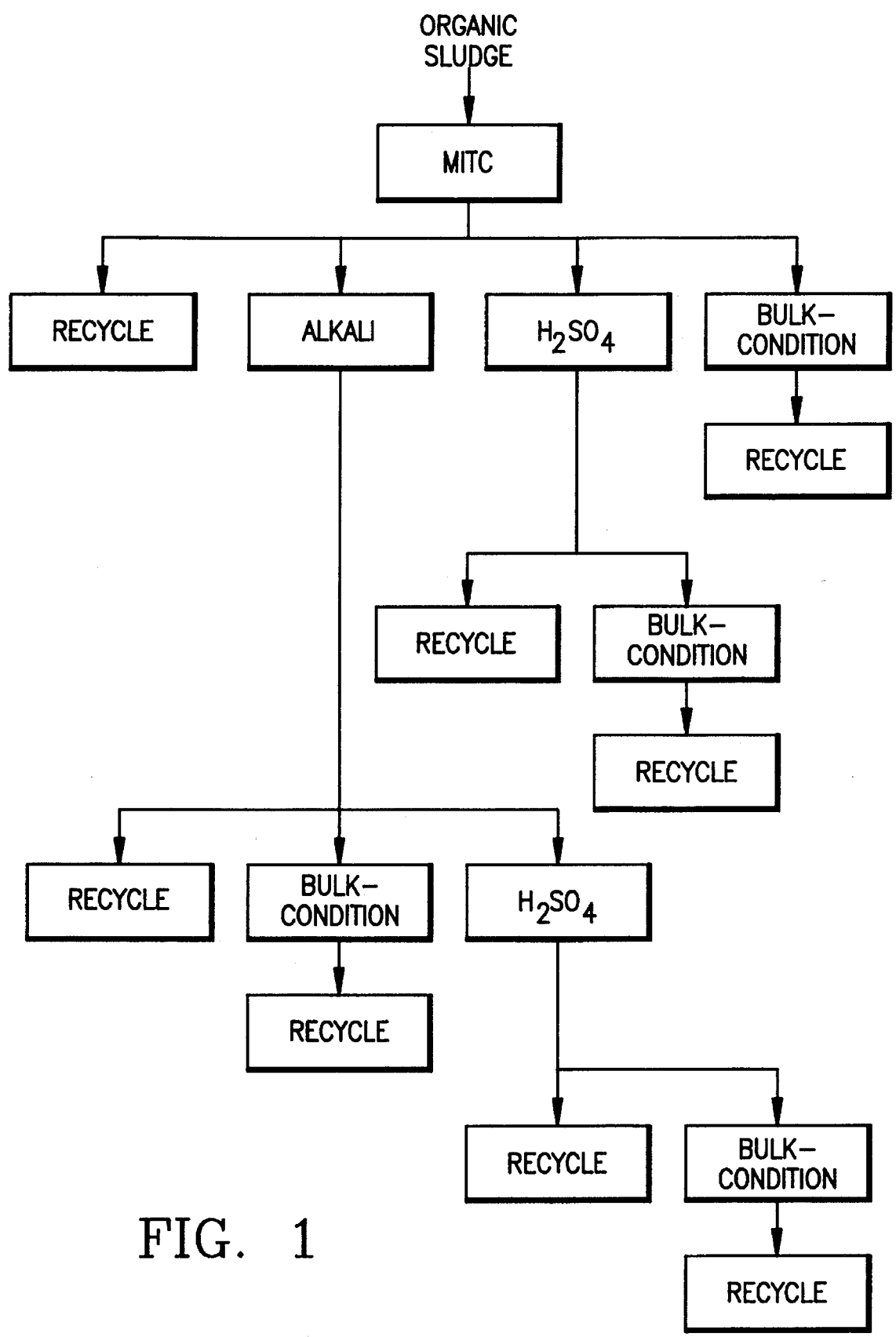
FIG. 1 is a flow chart of the preferred embodiment of the present invention, depicting various options which may be chosen for processing waste organic sludges for disposal or reuse as an agricultural composition.

Referring first to FIG. 1 is presented a flow chart of the preferred embodiment of the present invention. In said preferred embodiment the organic sludge, possibly harboring pathogenic bacteria, enteric viruses and/or helminth ova, is exposed to an effective amount of methyl-isothiocyanate ("MITC"). Said sludge may be exposed to MITC maintained in gaseous form and/or by exposing said sludge to a liquid containing various salts which liberate MITC under certain conditions. In the preferred embodiment of the invention we have found that the most convenient form for exposing said sludges to an effective amount of MITC is to thoroughly mix said sludge with a liquid having at least one MITC releasing chemical dissolved therein. In the preferred embodiment thorough mixing is readily accomplished by a portable double auger/paddle mixer, such as a Roto-Mix 6000, however any apparatus capable of intimately commingling a wet, cohesive mass (such as many sludges are) with liquids or gases would be satisfactory as well.

Such MITC releasing chemicals, for example, sodium N-methyldithiocarbamate, potassium N-methyldithiocarbamate and tetrahydro-3,5-dimethly-2H-1,3,5-thiadiazine-2-thione, dissolved in water, are used as soil fumigants for control of germinating weeds, parasitic nematodes, fungi and/or insects. Such salt solutions are typically stable in strong aqueous solution, but are typically unstable (decomposing, thereby releasing MITC) when diluted to form a weak solution. Such chemicals are at least somewhat soluble in organic solvents, such as methanol and ethanol, and could be applied to sludge dissolved therein, but would require substantially greater amounts (than stronger concentrations of water based solutions) to produce the same amount of MITC. Other alkali metal salts of monomethyldithiocarbamate or monoakyldithiocarbamate of any cation, such as sodium, potassium, lithium, or cesium, or heavier metals may also be used but may be more expensive to manufacture. Alkaline earth metal salts, such as magnesium, calcium, strontium, etc., of monomethyldithiocarbamate or monoakyldithiocarbamate could also be used. Regardless of which salt or solvent thereof is employed, the active biocide generated is MITC. MITC reacts with primary or secondary amine groups on biologically important molecules, such as enzymes, to form thioureas, thereby altering said molecules so that they can no longer perform their biochemical function. Since MITC reacts with a wide variety of biomolecules, it forms an effective biocide for pathogenic bacteria found in organic waste sludges. Rate of application for MITC as a bactericide has been found to be approximately 40 p.p.m. (parts, by weight, of MITC releasing salt per million parts, by weight, of the material to be treated; which is typically only the sludge, before it is mixed with other bulking materials, so as to minimize the amount of MITC releasing salt required).

Referring now to FIG. 2, laboratory testing discloses the effectiveness of MITC for exterminating helminth ova such as are frequently found in organic waste sludges. In said testing the MITC releasing compounds of sodium N-methyldithiocarbamate, potassium N-methyldithiocarbamate, or sodium N-methyldithiocarbamate and ethanol, were tested on ova, both with and without the inclusion of organic sludge from a municipal waste treatment plant therein. In a permutation of said tests the carbamate salt was deactivated by sulfuric acid after an initial 24 hour period of exposure. As seen in FIG. 2 even exposure rates as low as 150 p.p.m. of test solution (which in test 2 was 42.5% strength sodium N-methyldithiocarbamate) were fully effective as an ovacide, provided the carbamate was not deactivated by commingling with sulfuric acid prior to 21 days. As is also seen by FIG. 2, MITC exposure at approximately 1000 p.p.m. (1062.5 parts, by weight, of MITC releasing salt per million parts, by weight, of the material to be treated) is disclosed to be an effective biocide of helminth ova even if deactivated by acid after an initial exposure period of 24 hours (while some division of some eggs was observed, none developed viable larvae). Previously helminth ova were generally considered highly resistant to aqueous salt solutions because of their outer casing which is believed to be impervious to liquids. It was however known that the covering of helminth ova is permeable to at least some gases, as an oxygen gas exchange does occur across said casing (the ova will expire if maintained in an oxygen deprived environment). While no claim can be made to the particular mechanism by which MITC releasing salts form an effective biocide for helminth ova, it is believed that the covering of organisms is also, at least somewhat permeable to MITC gas (possibly in the form of MITC bubbles which attach to the casing, or perhaps in the form of gas dissolved in the solvent) and once MITC is admitted through the casing, MITC reacts with the biomolecules of the ova to make them incapable of performing their ordinary life support functions.

Referring to FIG. 3 is disclosed the results of virucidal efficacy testing of MITC combined with alkali on Poliovirus Type 1, Strain Brunhilde, ATCC VR1000. In said testing said virus was exposed to approximately 1000 p.p.m. sodium N-methyldithiocarbamate in water based solution and 20,000 p.p.m. potassium hydroxide for a period of approximately 24 hours. The pH of the mixture was 12.55 at the beginning of the period and 11.40 at the end of the exposure period. As is shown in FIG. 3 no viruses were found to have survived from said exposure, either in the presence of municipal waste treatment sludge, a test medium or in the presence of both sludge and test medium.

Accordingly, the preferred embodiment of the invention is thoroughly mixing an organic waste sludge to be treated with an aqueous solution having at least one MITC releasing salt, sufficient to bring the concentration of the MITC releasing salt in the admixture to substantially 1000 p.p.m.; thoroughly mixing said sludge with an alkaline solution, sufficient to bring the initial pH of the admixture to substantially 12 or more; and, maintaining the sludge in contact with said MITC releasing salt and said alkali for a period of substantially 24 hours or more. Said process is shown to be effective bactericide, ovacide and virucide for the types of pathologic organisms typically found in organic sludges. In the preferred embodiment of the invention, application of such treating chemicals is, of course, preferred before the addition of additives, polymers, bulking materials, and conditioning materials which are not infected with pathogenic organisms (hereinafter be described), in order to avoid the necessity of using increased quantities which would be required to produce effective concentrations of MITC and/or alkali. Despite the fact that treatment before the addition of non-infected materials to the sludge is preferred, treatment after such addition is nevertheless comprehended by the invention. Also comprehended by the invention is partial treatment of sludges which are known not to harbor at least some of the types of potentially pathogenic organisms typically found in organic waste sludges. For instance, if a particular sludge were known not to have any possibility of enteric viruses, elevation of the pH of the sludge to substantially 12 or more would be unnecessary, as MITC alone is shown to be biocidal to pathogenic bacteria and helminth ova. On the other hand, if a particular sludge were known not to have any helminth ova or enteric virus, then low levels of MITC (as low as 40 p.p.m.) is shown to be sufficient to exterminate enteric bacteria. These variances, and others which are depicted in the flow chart of FIG. 1, for particular known sludge conditions, are comprehended by the invention disclosed herein though not specifically set forth as the preferred embodiment.

As depicted in the flow chart/decision tree of FIG. 1, in addition to treatment of the organic waste sludge with MITC, to exterminate pathogenic bacteria and/or helminth ova, a decision must be made as to whether the sludge will thereafter be suitable for disposal without further treatment; whether treatment with an alkali is desired for extermination of enteric viruses, whether treatment with an acid is desired for deactivation of further MITC release (as may be desirable for accelerated restoration of beneficial bacteria or other specific applications), and/or whether further mixing of the disinfected sludge with bulking/conditioning materials (which may include soil additives/wetting agents, polymers, non-contaminated organic materials, and organic and/or non-organic conditioning materials) is desired to create a composition which recycles the sludge as a safe, highly enriched plant medium.

Treatment of the admixture (of the sludge and a MITC releasing salt, or the sludge, a MITC releasing salt and an alkali) with an acid is generally not preferred, and should be avoided if possible, for a variety of reasons. First it appears that such salts continue releasing MITC for an extended period of time after initial application, or possibly some MITC remains as a dissolved gas (the particular mechanism is not definitely known), but whichever is the case, if deactivated soon after initial application, its effectiveness is diminished, at least at the lowest levels of concentration, at least as an exterminator of helminth ova. Secondly, particularly if the sludge is to be recycled as a soil enriching material, many soils having substantial organic content tend to be acidic, and inclusion of some alkaline material therein is usually beneficial. If unavoidable and helminth ova are possibly present in the sludge, then either the concentration of the MITC releasing salt should be substantially 1000 p.p.m. or more or acid treatment should be delayed for substantially 21 days or more.

Preferably before optional deactivation of MITC by acid treatment as aforesaid the sludge may be treated with a water based, biodegradable, electrolytic soil additive, such as "Agri-SC Soil Treatment" by Four Star Services, Inc. into the admixture. In the preferred embodiment of the invention approximately 4–12 liquid ounces per ton of sludge produce at least two beneficial effects. Other dosage rates are also comprehended by the invention to increase or diminish said effects as may be desired. First, the wetting properties of such additive insures penetration of water, bearing dissolved MITC releasing salts, in and between the particulate matter of the sludge, thereby increasing the probability of MITC contact with all pathogenic bacteria that may be harboring therein. Secondly, inclusion of such electrolytic additive in the end product results in an improved agricultural product breaking hydroscopic rings which exist around colloidals included therein, improving the ability of plants to extract nutrients from therefrom.

Preferably before optional deactivation of MITC by acid treatment as aforesaid, the sludge may also be conditioned, for recycling as a plant medium, by adding of a hydrophilic polymer, such as potassium polyacrylate, to the MITC and/or alkali treated sludge. Said polymer absorbs excess water from the sludge, effectively "drying" same, so as to make it less cohesive and easier to handle. The addition of polymer also improves the water retention characteristic of the admixture, which produces a number of desirable effects. First, improved water retention characteristics reduce the ability of odoriferous molecules to escape from mixture, further reducing odor and vector attraction. Secondly, increased water absorption provides for increased retention time of MITC dissolved therein, thereby providing an increased period of contact between MITC and pathogenic organisms. Finally, increased water retention, and reduced evaporation, improve the characteristics of the composition for use as an agricultural medium and/or soil conditioning agent. Mixing of approximately 2 pounds of powdered potassium polyacrylate per ton has been found effective for sludges bearing approximately 80% water content. Dosage may, however, be varied depending on the absorbency of the particular hydrophilic polymer chosen. Any amount of hydrophilic polymer may be added to produce a desired amount of "drying" of the sludge, and a desired water retention characteristics of the end product.

A final, also optional, step in making an easily usable agricultural medium, is the inclusion of bulk, non-pathogenic organic and/or non-organic conditioning material. An almost endless variety of such materials may be used, to bind the highly enriched organic sludge to particulate matter which tends to remain in place, and to impart desired soil conditioning characteristics to the end product. Common additions may include seed husks, hulls, shells, sawdust, ground animal shell and bones, boiler ash, crop stubble, leaves, hay, grass, charcoal, carbon black, diatomaceous earth and other organic matter. Bulking agents such as sand, mica, vermiculite, limestone and the like may also be used, according to the conditioning properties desired in the end product. Once these materials are blended with the sludge, (especially sewer sludge) the cohesive texture of the sludge is further reduced and the end product has the consistency of a potting soil type texture. This makes it much easier to apply to or in the soil with the existing, simple, conventional application equipment of the agricultural industry.

In one field test approximately 1400 lbs of treated sludge was treated and thoroughly mixed with approximately 2800 lbs of sawdust. The end product was a dark, finely divided, non-cohesive, powder having a slight scent of freshly tilled earth, which was found free of pathogenic bacteria. The invention has now been found to be effective in exterminating helminth ova and enteric viruses as well.

The above-described preferred embodiment should be interpreted as illustrative and not in any sense of limiting the scope of the invention, which is set forth by the following claims and their equivalents.

What is claimed is:

1. A method for disinfecting organic waste sludge of pathogenic bacteria comprising the step of commingling said sludge with an aqueous based solution having a solute of at least one chemical salt which releases an effective concentration of gaseous methyl-isothiocyanate in aqueous solution.

2. The method of claim 1 wherein said effective concentration of methyl-isothiocyanate is produced by thoroughly mixing said sludge with aqueous based solution having a solute of at least one salt of a class of chemical salts which release gaseous methyl-isothiocyanate in aqueous solution.

3. The method of claim 2 wherein at least one chemical salt in said class of chemical salts which release methyl-isothiocyanate is a monomethyldithiocarbamate salt.

4. The method of claim 3 wherein at least one said monomethyldithiocarbamate salt has a metal cation.

5. The method of claim 4 wherein at least one said metal cation is sodium.

6. The method of claim 3 wherein at least one chemical salt in said class of chemical salts is sodium N-methyldithiocarbamate.

7. The method of claim 4 wherein at least one said metal cation is potassium.

8. The method of claim 3 wherein at least one chemical salt in said class of chemical salts is potassium N-methyldithiocarbamate.

9. The method of claim 2 wherein at least one chemical salt in said class of chemical salts which release methyl-isothiocyanate is a monoalkyldithiocarbamate salt.

10. The method of claim 2 wherein at least one chemical salt in said class of chemical salts which release methyl-isothiocyanate is tetrahydro-3,5-dimethly-2H-1,3,5-thiadiazine-2-thione.

11. The method as in any of claims 2–10 inclusive wherein said effective concentration of methyl-isothiocyanate is caused by mixing at least forty parts by weight of said solute per million parts by weight of sludge.

12. The method as in any of claims 2–10 inclusive wherein a sludge to be disinfected of bacteria is commingled with substantially forty parts by weight or more of at least one chemical salt which releases methyl-isothiocyanate per million parts by weight of said sludge.

13. The method as in any of claims 2–10 inclusive wherein said effective concentration of methyl-isothiocyanate is caused by mixing at least one hundred parts by weight of said solute per million parts by weight of sludge.

14. The method as in any of claims 2–10 inclusive wherein said effective concentration of methyl-isothiocyanate is caused by mixing at least one thousand parts by weight of said solute per million parts by weight of sludge.

15. A method for disinfecting organic waste sludge of helminth ova comprising the step of commingling said sludge with an aqueous based solution having a solute of at least one chemical salt which releases an effective concentration of gaseous methyl-isothiocyanate in aqueous solution.

16. The method of claim 15 wherein said commingling is accomplished by thoroughly mixing a sludge to be disinfected of helminth ova with aqueous based solution having a solute of at least one salt of a class of chemical salts which release gaseous methyl-isothiocyanate in aqueous solution.

17. The method of claim 16 wherein at least one chemical salt in said class of chemical salts which release methyl-isothiocyanate is a monomethyldithiocarbamate salt.

18. The method of claim 17 wherein at least one said monomethyldithiocarbamate salt has a metal cation.

19. The method of claim 18 wherein at least one said metal cation is sodium.

20. The method of claim 17 wherein at least one chemical salt in said class of chemical salts is sodium N-methyldithiocarbamate.

21. The method of claim 18 wherein at least one said metal cation is potassium.

22. The method of claim 17 wherein at least one chemical salt in said class of chemical salts is potassium N-methyldithiocarbamate.

23. The method of claim 16 wherein at least one chemical salt in said class of chemical salts which release methyl-isothiocyanate is a monoalkyldithiocarbamate salt.

24. The method of claim 16 wherein at least one chemical salt in said class of chemical salts which release methyl-isothiocyanate is tetrahydro-3,5-dimethly-2H-1,3,5-thiadiazine-2-thione.

25. The method as in any of claims 16–24 inclusive wherein said effective concentration of methyl-isothiocyanate is caused by mixing at least sixty parts by weight of said solute per million parts by weight of sludge.

26. The method as in any of claims 16–24 inclusive wherein a sludge to be disinfected of helminth ova is commingled with substantially sixty parts by weight or more of at least one chemical salt which releases methyl-isothiocyanate per million parts by weight of said sludge.

27. The method as in any of claims 16–24 inclusive wherein said effective concentration of methyl-isothiocyanate is caused by mixing at least one thousand parts by weight of said solute per million parts by weight of sludge.

28. The method as in any of claims 16–24 inclusive wherein said effective concentration of methyl-isothiocyanate is caused by mixing at least two thousand five hundred parts by weight of said solute per million parts by weight of sludge.

29. The method of claim 25 further comprising the step of protecting the admixture of sludge and chemical salt which release methyl-isothiocyanate from the introduction of acid for a period of substantially twenty-one days or longer.

30. The method of claim 26 further comprising the step of protecting the admixture of sludge and chemical salt which release methyl-isothiocyanate from the introduction of acid for a period of substantially twenty-one days or longer.

31. The method of claim 27 further comprising the step of protecting the admixture of sludge and chemical compounds which release methyl-isothiocyanate from the introduction of acid for a period of substantially twenty-four hours or longer.

32. A method for disinfecting organic waste sludge of pathogenic bacteria, helminth ova and enteric virus comprising the steps of:

a. commingling said sludge with an aqueous based solution having a solute of at least one chemical salt which releases an effective concentration of gaseous methyl-isothiocyanate in aqueous solution; and, b. commingling said sludge with an effective concentration of a base.

33. The method of claim 32 further comprising the step of:

c. maintaining said sludge in contact with methyl-isothiocyanate for an effective length of time.

34. The method of claim 32 wherein said effective concentration of methyl-isothiocyanate is caused by thoroughly mixing said sludge with a liquid having a solute of at least one of a class of chemical compounds which release methyl-isothiocyanate.

35. The method of claim 32 wherein said effective concentration of methyl-isothiocyanate is caused by mixing at least sixty parts by weight of said solute per million parts by weight of sludge.

36. The method of claim 32 wherein said effective concentration of methyl-isothiocyanate is caused by mixing at least one hundred parts by weight of said solute per million parts by weight of sludge.

37. The method of claim 32 wherein said effective concentration of methyl-isothiocyanate is caused by mixing at least one thousand parts by weight of said solute per million parts by weight of sludge.

38. The method of claim 32 wherein said effective concentration of methyl-isothiocyanate is caused by mixing at least two thousand five hundred parts by weight of said solute per million parts by weight of sludge.

39. The method as in claim 32 wherein said effective concentration of base is that which is sufficient to elevate the pH of the sludge to substantially 12 or more.

40. The method as in claim 33 wherein said effective length of time is substantially twenty four hours or longer.

41. The method as in claim 33 wherein said effective length of time is substantially seven days or longer.

42. The method as in claim 33 wherein said effective length of time is substantially twenty one days or more.

* * * * *